United States Patent [19]

Harrington

[11] 4,430,563

[45] Feb. 7, 1984

[54] DATA PROCESSING FORM

[75] Inventor: John A. Harrington, St. Paul, Minn.

[73] Assignee: Minnesota Mining and Manufacturing Company, St. Paul, Minn.

[21] Appl. No.: 373,666

[22] Filed: Apr. 30, 1982

[51] Int. Cl.³ .............................................. G06K 19/06
[52] U.S. Cl. .................................... 235/494; 235/456; 235/487
[58] Field of Search .................. 235/487, 494, 456

[56] References Cited

U.S. PATENT DOCUMENTS 4,113,993  9/1978  Heckman .................. 235/494 X

Primary Examiner—Harold I. Pitts
Attorney, Agent, or Firm—Donald M. Sell; James A. Smith; Robert L. Marben

[57] ABSTRACT

A data processing form for providing control information to apparatus, such as facsimile machines, having a scanner. The form has darkened areas which establish a row and column format with an elongate edge mark provided for each row. The edge marks extend to the edge of the form. Areas to be filled in by a user are defined using some of the darkened areas. The form format minimizes the software needed for circuitry used to process the information obtained from the form serving to reduce the time needed to scan the form.

7 Claims, 1 Drawing Figure

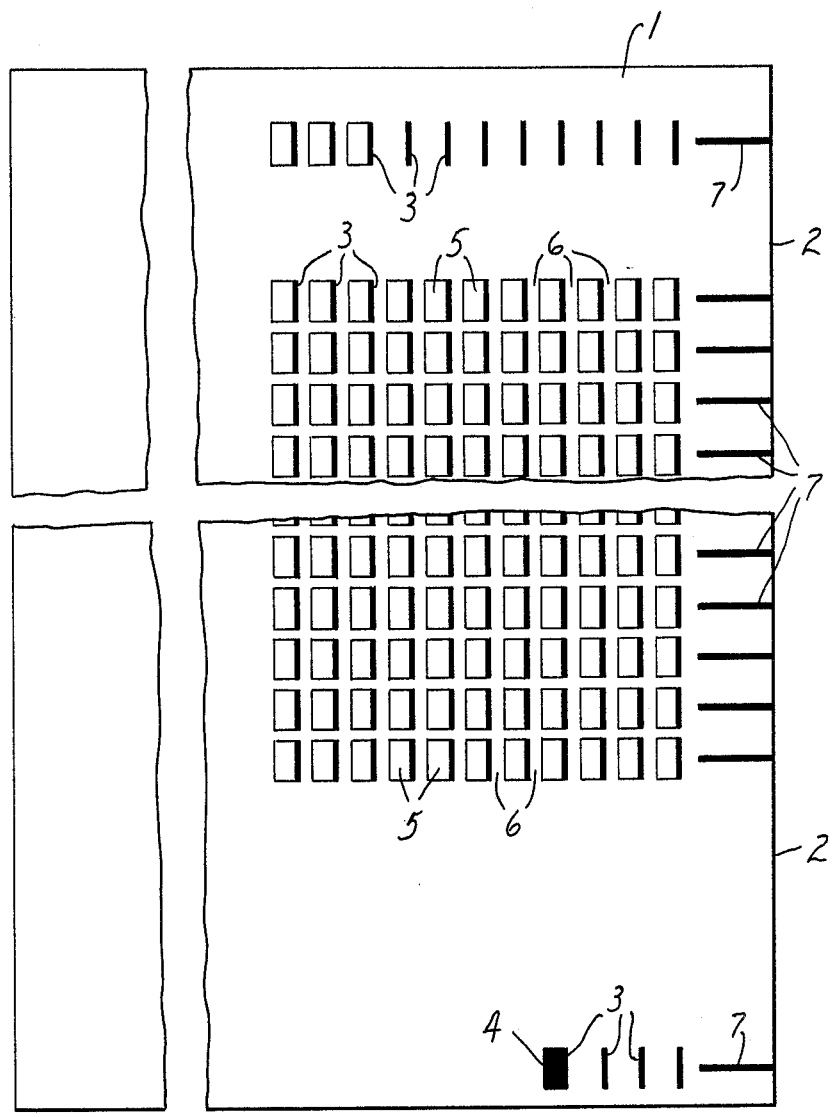

DATA PROCESSING FORM

BACKGROUND OF THE INVENTION

This invention relates to data processing forms useful with apparatus, such as facsimile machines, using a line-by-line type scanner to provide an output signal based on the amount of light reflected from the sheet being scanned.

Although there has been the wide-spread commercial acceptance of facsimile machines, it is recognized that use of the machines can be enhanced if the operation of facsimile machines can be simplified so that users can operate the machines with a minimum amount of instruction plus minimal operator intervention and supervision. It is noted that some effort has been made in this area since it has been recognized that facsimile machines which provide for optical line-by-line scanning of a document to provide for the transmission of signals based on the graphic information presented on the document can be adapted to scan information placed on a data processing form which can be used to provide automatic modification of the operation of the facsimile machine. For example, it is possible, as disclosed in U.S. Pat. No. 4,113,993 to Heckman et al, to use a document processing form to provide information to a facsimile machine to provide for the automatic dialing from another facsimile machine in accordance with the number as entered on the document processing form.

The use of document processing forms scanned by the facsimile machine to supply information to the facsimile machine requires electronic processing of the signals obtained by the scanning process. Such processing involves the use of microprocessors and associated memory. It is desirable, therefore, that the format used for a document processing form be one that presents the necessary information in a manner such that the information can be located and processed as quickly as possible while providing for redundant error checking for both user errors and mechanical skew of the form as it moves through the scanning apparatus in order to increase the reliability of the scanning process and permit the use of simplified software programs which will serve to minimize the amount of memory required

SUMMARY OF THE INVENTION

Efficient and accurate processing of information entered on a data processing form, when scanned in an apparatus on a line-by-line basis, is obtained by data processing forms made in accordance with the present invention wherein the data processing form is provided by a generally rectangular sheet of paper or like material having longitudinal and transverse axes, and at least one generally straight edge parallel with one of said axes for use with such apparatus and includes a plurality of like, generally rectangular darkened areas that extend lengthwise and generally parallel to the straight edge provided. A plurality of rows is defined by the rectangular darkened areas which are equally spaced apart in each row. Each of the rows extend transverse to the straight edge with the space presented between adjacent ones of the rectangular darkened areas in any given row being greater than the width of a rectangular darkened areas. The rectangular darkened areas in a given row are aligned columnwise with said rectangular dark areas presented in the remaining rows. The first row of the plurality of rows to be scanned by an apparatus identifies the type of information that is provided by the form. This first row has at least one darkened area which is formed in part by one of the rectangular darkened areas and which extends from the side of such rectangular darkened area that is away from said straight edge. Another row of the plurality of rows has at least two defined areas wherein each of the defined areas is defined in part by a different one of said rectangular darkened areas of such row and is located on the side of such rectangular darkened area that is away from said straight edge. An edge mark is provided for each of the rows and is positioned a short distance from the first rectangular darkened area of the row and is positioned between the first rectangular darkened area of the row and said straight edge.

As indicated, the rectangular darkened areas are equally spaced in each row. Defined areas, as described, can be established, as may be required, relative to any of the rectangular darkened areas. This symmetrical arrangement allows use of the same software loop program for all of the rectangular darkened areas of all of the rows. The edge mark is used to locate a row. Once the first edge mark is detected during a scanning operation, the symmetrical location of the various rows allows the use of a simple jump ahead software program to locate the next row. This reduces the time needed for scanning the form since the portion of the form between edge marks can be ignored.

An improvement to the data processing form that has been described is provided by use of an edge mark which extends to the straight edge of the paper or the form. This serves to speed up the location of an edge mark, since the detection of a white area during the beginning of a scan serves to immediately indicate that an edge mark is not present eliminating any delay in the start of the next scan line which could occur if all of the signals for that line scan had to be processed.

Another feature of the data processing form made in accordance with the present invention involves the use of an elongate edge mark. The edge mark is positioned so that its lengthwise position is transverse to the straight edge of the sheet of paper. In addition, the edge mark is centered relative to the length of the rectangular darkened areas for a given row. The width of the edge mark is substantially less than the length of the rectangular darkened areas. An edge mark that is so positioned and configured marks the data processing form compatible with the skew that can occur for a given apparatus using the data processing form. It assures that once an edge mark is properly detected by a scan, all of the rectangular darkened areas in the row for such edge marker and any associated defined areas will be detected during such scan.

DESCRIPTION OF THE DRAWINGS

For a more complete understanding of the present invention, reference is made to the following detailed description which refers to the single FIGURE of the accompanying drawing which shows a data processing form embodying the invention.

DETAILED DESCRIPTION

Referring to the drawing, a data processing form is shown which is for use with an apparatus capable of providing a plurality of line scanning actions as the form is moved through the apparatus with each of the line scanning actions beginning near the edge of the form and continuing in the direction generally transverse to such edge. The scanning portion of such apparatus senses the presence of light and dark areas on the form. The data processing form is provided by a generally rectangular sheet 1 of paper or like material capable of being marked with a pen or pencil. Since it is contemplated that the form will be repeatedly used with an apparatus to enter the data contained on the form, any material selected for the sheet should be selected for its durability, as well as the marking characteristics mentioned. For reference purposes, the sheet will be considered to have a longitudinal axis and a transverse axis. In the case of the FIGURE of the drawing, the longitudinal axis extends vertically of the sheet shown. The sheet 1 is provided with at least one generally straight edge that is parallel with one of the axes. In the FIGURE of the drawing, the straight edge is indicated at 2 and runs parallel with the longitudinal axis of the sheet.

A plurality of like, generally rectangular darkened areas 3, each extending lengthwise and generally parallel to the straight edge 2, are provided as a part of the form. The reference number 3 is applied only to represent darkened areas to identify the rectangular darkened areas on the form. The darkened areas 3 are placed so as to define a plurality of rows with the areas 3 of each row being equally spaced apart and with the rows extending transverse to the straight edge 2. The space between darkened areas 3 is greater than the width of one of the darkened areas 3. The darkened areas 3 in any given row are aligned columnwise with the corresponding darkened areas 3 that are present in the remaining rows.

The row, at the bottom of the FIGURE of the drawing established by the rectangular darkened areas 3, is the first row to be scanned. The first row to be scanned provides a code by which the particular form that is set forth is identified. In the case of the embodiment shown in the drawing, four rectangular darkened areas 3 are provided. The first row also includes a darkened area 4 which extends from the side of a darkened area 3 that is away from the straight edge 2. The number of darkened areas 3 used in the first row determines the number of possible different forms that can be identified by the first row. Using a binary numbering system, with a darkened area 4 to indicate a one and a zero by just a darkened area 3, the four positions established by the darkened areas 3 will provide for the identification of sixteen different forms, should that be required. If a larger or lesser number of forms were to be utilized, it is only necessary to increase or decrease the number of darkened areas 3 in the first row.

Use of the form requires the user of a form to provide a darkened area 4 with a darkened area 3 as required. To assist the user, defined areas 5, that may be darkened by the user per instructions provided to the user, are defined on the form and in the case of the form shown are defined by like rectangles wherein the right side of the rectangle, as viewed in the FIGURE, is provided by a darkened area 3. It is also possible to use an ink of a color that is not responsive to the scanning arrangement provided by an apparatus to define the various areas to the left of the darkened areas 3, as may be required, which a user would darken with a pen or pencil per instructions. A space or gap, such as indicated by reference numeral 6, is provided between adjacent defined areas 5 in a row that may be darkened by the user of the form. This space is less than the width of a defined area 5.

In addition to having the darkened areas 3 equally spaced apart in each of the rows, the various rows are spaced apart in a regular or ordered manner in a vertical direction per the FIGURE as viewed in the drawing. Referring to the FIGURE in the drawing, the distance from a selected point on a darkened area 3 in the bottom row to the corresponding point on corresponding darkened area 3 of the next row is a measure of the vertical spacing that it utilized in the placement of the rows in that any row on the form is spaced a multiple of such distance from the first or bottom row of the form.

The defined areas 5 in a given row to be filled in by a user will be determined by the instructions given the user. Since the darkened areas 3 are regularly spaced in each of the rows and are also aligned columnwise, the darkened areas 3 serve to provide a recurring check on the validity of the darkened areas and the row as a whole. The gap 6 provided between the defined areas 5 are also presented in a regularly spaced fashion serving to provide a recurring error check for each of the defined areas 5.

The form according to the present invention provides for the use of an elongate edge mark 7 for each row of darkened areas 3 which, when scanned, serves to provide information that a row has been located. The lengthwise dimension of the edge mark 7 extends transversely relative to the edge 2 and is substantially greater than the dimension of the darkened areas 3 in the same direction. The edge mark 7 begins at the edge 2 of the form so the presence of an edge mark 7 will be immediately detected with the start of a line scan. In the event a predetermined length of "white" is detected at the beginning of the line scan, such information can be used as the basis for discontinuing any further process of signals for that scan, thus, eliminating a possible delay in the scanning process. Each edge mark 7 is located at the same point relative to the darkened area 3 for a row so that once the edge mark 7 for the first or bottom row of the form is located, it is known where the next edge mark should be located serving to simplify the software needed to process scanning signals. It also allows the form to be moved rapidly to the next point where an edge mark is expected to be located since the intervening area on the form need not be scanned and the signals processed. Scanning time for the entire form is thus shortened.

In the form shown in the drawing, the edge mark 7 for each row is centered relative to the vertical dimension of the darkened areas 3 for the row. The length and width of each of the edge marks 7 are the same. The width of the edge mark 7 is substantially less than the length of the darkened area 3. The desired width and length of the edge mark 7 is determined from a consideration of the largest number of darkened areas 3 that may be present in a row in any form to be used with an apparatus, the length of the darkened areas 3, the degree of skew that the apparatus may impart to the form when the form is moved through the apparatus for scanning plus the number of successive signals from the scanner indicative of a dark area that will be used to indicate the presence of an edge mark 7. With such factors taken into consideration and assuming the form as set forth in the FIGURE of the drawing has the maximum number of darkened areas 3 for each row that would be used in any form, the degree of skew in either direction that could be tolerated by the form shown can be determined by locating the longest row in the form and drawing a line from the edge mark 7 for the row where it joins edge 3 of the sheet to the upper or lower left-hand corner of the left-hand most defined area 5 for such row. The degree to which this drawn line deviates from a line drawn lengthwise of the edge mark 7 for the row is a measure of the skew the form can be subjected to and still provide reliable information when scanned. The edge mark 7 for each row does not extend to the first darkened area 3 for the row. The space provided between the end of and edge mark 7 and the first darkened area in a row is about the same as the gap 6.

The length of the various spaces or "white" areas present in a row as defined by an edge mark 7 and darkened areas 3, are arranged to be less than a predetermined length of "white". This allows use of such predetermined length of "white" in writing software for processing the scanning signals to provide for the termination of the processing of the signals for a scan line. This aspect can be used to decrease the time required to a complete scan of the form.

While only one data processing form has been shown and described which embodies the invention, considerable latitude is available to those skilled in the art to make modifications without departing from the novel teachings disclosed. Accordingly, the scope of this invention is intended to be limited only as defined in the appended claims, which should be accorded a breadth of interpretation consistent with this specification.

What is claimed is:

1. A data processing form provided by a generally rectangular sheet of paper or like material having longitudinal and transverse axes, and at least one generally straight edge parallel with one of said axes for use with an apparatus capable for providing a plurality of scanning actions as the sheet is moved in the general direction of said straight edge, each of said scanning actions beginning near said straight edge and continuing in a direction generally transverse to said straight edge, said scanning actions serving to sense light and dark areas on the sheet, said form including: a plurality of like, generally rectangular darkened areas that extend lengthwise and generally parallel to said straight edge; a plurality of rows defined by said rectangular darkened areas, equally spaced apart in said rows; each of said rows extending transverse to said straight edge with the space presented between adjacent ones of said rectangular darkened areas in any given row being greater than the width of one of said rectangular darkened areas; said rectangular darkened areas in a given row being aligned columnwise with said rectangular dark areas presented in the remaining rows of said plurality of rows; the first of said plurality of rows to be scanned by an apparatus, having at least one darkened area formed in part by one of said rectangular darkened areas and extending from the side of such rectangular darkened area that is away from said straight edge; another row of said plurality of rows having at least two defined areas wherein each of the defined areas is defined in part by a different one of said rectangular darkened areas of such row and is located on the side of such rectangular darkened area that is away from said straight edge and an edge mark for each of said plurality of rows, said edge mark for each row positioned between the first rectangular darkened area of the row and said straight edge.

2. A data processing form according to claim 1 wherein said edge mark for each of said rows is centered relative to the length of said rectangular darkened areas of the row.

3. A data processing form according to claim 1 wherein said edge mark for the first of said rows to be sensed extends to said generally straight edge.

4. A data processing form according to claim 1 wherein said edge mark for each of said rows is centered relative to the length of said rectangular darkened areas of the row and said edge mark for the first of said rows to be sensed extends to said straight edge.

5. A data processing form according to claim 2 wherein the dimension of said edge mark in the direction parallel with said straight edge is substantially less than the corresponding dimension of said rectangular darkened area.

6. A data processing form according to claim 2 wherein said edge mark for each row is spaced a distance from said first rectangular darkened area of the row that is not greater than the space between two adjacent rectangular darkened areas of said rectangular darkened areas in one of said rows.

7. A data processing form according to claim 5 wherein the dimension of said edge mark in the direction transverse to said straight edge is greater than said corresponding dimension of said rectangular darkened area.

* * * * *